June 20, 1967     E. R. LODGE     3,326,532
MIXING DEVICE
Filed Aug. 31, 1965     2 Sheets-Sheet 1
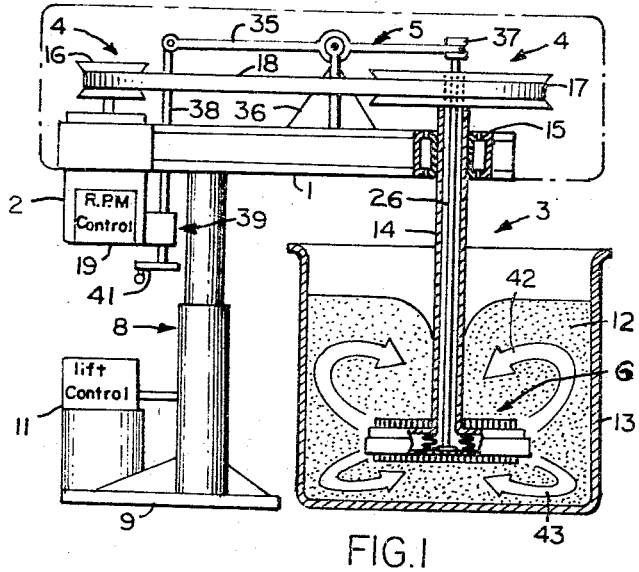
FIG. 1
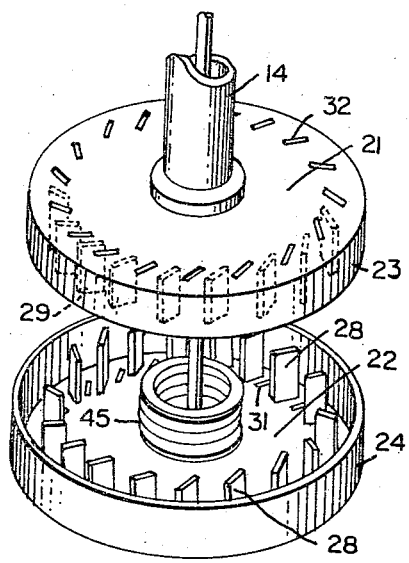
FIG. 4
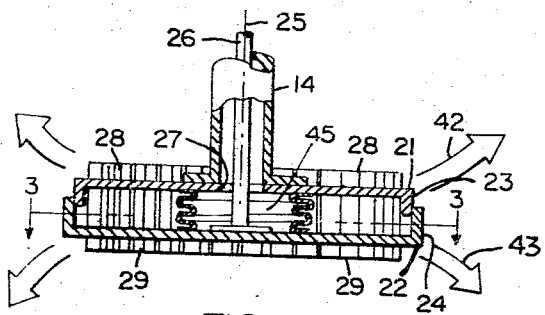
FIG. 2
FIG. 3
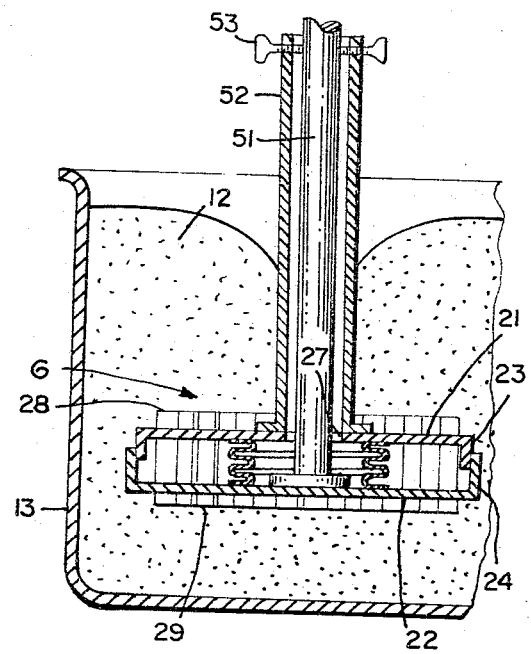
FIG. 5
INVENTOR
EDMUND R. LODGE
BY *Robert T. Dunn*
ATTORNEY June 20, 1967     E. R. LODGE     3,326,532
MIXING DEVICE
Filed Aug. 31, 1965     2 Sheets-Sheet 2

INVENTOR
EDMUND R. LODGE
BY,
Robert T. Dunn
ATTORNEY

United States Patent Office 3,326,532
Patented June 20, 1967

3,326,532
MIXING DEVICE
Edmund R. Lodge, 29 Mount Hood Road,
Brighton, Mass. 02135
Filed Aug. 31, 1965, Ser. No. 484,009
5 Claims. (Cl. 259—96)

This invention relates to devices for mixing a fluid and more particularly to a device for mixing a liquid fluid including novel means for varying the rate of mixing.

Heretofore, rotary mixers for mixing a fluid or for mixing a fluid and a gas as done in aeration mixing processes has been accomplished with a rotating agitator immersed in the liquid. The structure of the agitator varies considerably. Some agitators are formed of a simple disk with fixed impellors protruding along the edge of the disk in directions transverse to the plane of the disk. Other types of agitators employed, particularly, where a gas is mixed with a liquid, include parts which may be fixed in different positions to thereby define different size openings through which the mixture of fluid and gas are forced by centrifugal action during the mixing process. This latter type of agitator does not include impellers but imparts a spin motion at the point of mixing of the gas and liquid so that the mixture moves radially relative to the axis of the spin by centrifugal force. The flow rate of the mixture in the radial direction is determined in part by the size of the openings already mentioned which in some applications can be adjusted as required before the mixer is employed.

As a general rule, the relatively large volume of power mixers, including agitators such as those described above, are driven by an electric motor through a mechanical drive that connects the motor with a shaft carrying the agitator. Such mixers are frequently employed to mix a variety of different fluids of different viscosity. Accordingly, the power and speed of the agitator are preferably controllable and at least can be preset before commencing mixing of each new type of fluid. In fact, it is preferred that both the power and speed of the agitator be variable during the course of mixing any given fluid, emulsion or mixture of fluid and solid. This is required where, for example, the viscosity of the fluid changes during the course of mixing. Since the agitator includes fixed impellor blades, variation of the mixing rate or variation of the mixing effects of the impellor blades on the fluid can only be accomplished by varying the rotational speed of the agitator. For this purpose the mechanical coupling between the motor and the shaft often includes a variable speed transmission with suitable controls for varying the speed of rotation of the agitator during the mixing process as required for proper mixing of the fluid. An alternative arrangement to eliminate the variable speed transmission employs a variable speed motor. In either event, whether the variable speed motor or the variable speed transmission is employed, the drive system is substantially more expensive than a constant speed drive system of the same rating. Accordingly, it is one object of the present invention to provide such a mixer driven in rotation by a relatively simple constant speed drive system and which may be controlled to vary the mixing effect on the fluid, emulsion or mixture of fluids and solids.

It is another object to provide a mixing device for mixing a fluid or for mixing a fluid and a solid which is immersed in the fluid and rotated and is subject to controls which vary the mixing effect at any particular rotating speed of the device.

It is another object to provide a device for mixing a fluid including means which are immersed in the fluid and rotated and in which the mixing effect is variable other than by varying the speed of said rotation.

It is another object to provide a mixing device of relatively simple construction for mixing fluids and with means connected thereto for varying the rate, degree, extent, time and effect of said mixing.

It is another object to provide a device for mixing a fluid which can be controlled by relatively simple mechanisms to mix a variety of different kinds of fluids.

It is another object to provide a device for imparting turbulent motion to a fluid and with relatively simple mechanisms connected thereto for varying the rate of energy transfer from the device to said fluid.

It is another object of the present invention to provide a device for mixing a fluid whereby the drive power applied to the device and the mixing effect of the device on the fluid are independently variable during the course of mixing.

It is another object to provide a device for mixing a fluid with means for driving the device in rotation at substantially constant speed and with means for varying the power of said drive and the effect of said mixing during the course of mixing said fluid.

In accordance with principal features of the present invention, there is provided an agitator mechanism mounted on a shaft which is driven in rotation by a drive means which may be a constant speed drive or a variable speed drive depending upon the application. The agitator includes blades or impellors moveable with respect to each other or with respect to other parts of the agitator and a mechanical coupling consisting of a rod extending from a portion thereof, preferably coaxially with the shaft. The rod connects to a mechanism which positions the rod so that the blades or impellors are moved. In a preferred embodiment, this motion effectively varies the area of the blades which protrude into the fluid and so at any given speed of rotation the mixing effect of the blades, which is related to the area of the blades that protrudes into the fluid, is varied by the movement of the rod. Thus, there is provided a mixer having two parameters which can be varied during operation thereby to vary the rate of energy exchange between the mixer and the fluid and the mixing effect. These parameters are rotational speed and blade or impellor area. The mixing effect, as employed herein, is a function of these two parameters, speed and area, and in addition is a function of numerous other parameters such as, for example, the number, shape, angle and position, of the blades as well as the viscosity and flow characteristics of the fluid which, in turn, may be dependent upon fluid temperature, pressure and/or extent of mixing. The present invention is concerned primarily with only two of these parameters namely speed of rotation and blade area and the effects of these parameters on drive power, thoroughness of mixing, and mixing time. The latter two are generally indicative of what is referred to as efficiency of mixing.

The above and other objects of the present invention will be apparent from the following specific description taken in conjunction with the figures in which:

FIGURE 1 is a view of a relatively high powered mixing device incorporating various features of the present invention for mixing fluid in a container;

FIGURE 2 is a side sectional view taken through the axis of the mixing unit shaft to illustrate the functioning and parts of a mixer agitator;

FIGURE 3 is a plane sectional view of the lower part of the mixer agitator;

FIGURE 4 is a partially exploded view of the mixer agitator;

FIGURE 5 is a plane sectional view through the axis of the shaft to illustrate an alternate embodiment for varying the area of the blades which extend from the agitator into the fluid;

Figure 6:
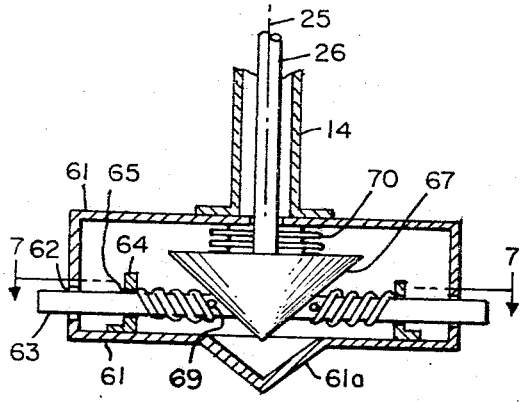
FIGURES 6 and 7 are side and plane sectional views of another agitator including blades which project radially from the drive shaft into the fluid medium.

Turning first to FIGURE 1 there is shown a mixing device including a platform 1 carrying a drive motor 2, a mixing unit 3, a drive transmission 4 for coupling the motor to the mixing unit and a blade area control mechanism 5 for varying the projecting area of the blades or impellors of the agitator 6. Thus, means are provided for varying the area of the agitator blades which is effective to mix the fluid.

For convenience, the platform 1 is mounted on a hydraulic lift 8 which is in turn supported by a platform 9 carrying a suitable hydraulic system 11 for controlling the lift, thereby to vary the elevation of the platform 1 so that the agitator 6 projects to any desired depth into the fluid 12 which is to be mixed and which is enclosed by a container 13. Obviously, when mixing large quantities of such fluid a relatively large structure is required including a motor of substantial horsepower and the total weight carried by the platform 1 is considerable. Thus, a correspondingly powerful hydraulic lift is required to position the platform so as to maneuver the agitator to the proper depth in the fluid.

The mixing unit 3 includes a hollow shaft 14 with the agitator 6 connected to one end and immersed in the fluid 12. A bearing 15 attached to the other end of the shaft rotatable attaches the shaft to the platform 1 so that the shaft is supported by the bearing fixed to the platform. The transmission mechanism 4 which connects the motor 2 to the shaft 14 includes, for example, a pulley 16 attached to the motor rotor and another pulley 17 attached to the shaft 14 with a suitable drive belt 18 connecting these pulleys. The transmission 4 obviously maintains a fixed speed ratio between the shaft and the motor and so rotational speed variation must be accomplished by varying the motor speed. In applications where it is desirable to vary the rotational speed of the mixing unit, the motor 2 may be a variable speed motor energized through a control 19 or the motor may be a constant speed motor and the transmission 4 may be a variable speed transmission or both a variable speed motor and a variable speed transmission may be employed. On the other hand, for applications where a sufficient mixing range can be achieved by control of the agitator 6 without varying the speed of the agitator, the motor 2 may be a fixed speed motor and the transmission 4 may be a simple fixed ratio transmission mechanism, as illustrated in the figure. One important advantage of the present invention is that the additional parameter of blade or impellor area is available for variation, thereby to vary the mixing. Variation of this parameter alone provides sufficient flexibility of operation for some applications so that variation in mixing speed is not required.

FIGURES 2, 3, and 4 illustrate one suitable construction of the agitator 6 which attaches to the hollow drive shaft 14 as illustrated. The agitator includes upper and lower plates 21 and 22 equipped with rims 23 and 24 at their respective periphery and dimensioned so the rim 24 attached to the lower plate 22 overlaps the outside of rim 23 which attaches to the upper plate 21 as shown in FIGURE 2. The upper plate 21 attaches to the hollow shaft 14 by, for example, welding or bolting thereto so that the plane of the plate 21 is transverse to the axis 25 of the shaft.

A blade area control rod 26 is disposed concentric with axis 25 inside the shaft 14 and extends through an opening 27 at the center of the upper plate 21 and attaches by welding or by bolting to the center of the lower plate 22. Thus, longitudinal motions of the rod 26 vary the spacing between the plates 21 and 22.

Each of the plates 21 and 22 carries a set of blades or impellors which are fastened to the plate just inside the rim and extend from each plate toward the other plate in a direction substantially parallel to the axis 25. Alternately disposed between the blades of each set are openings or slots in each of the plates to accommodate the blades extending theretoward from the opposing plate. These slots are sufficiently large and properly shaped to permit the opposing blade to extend through the opposing plate. More particularly, as shown in FIGURE 4, the lower plate 22 carries a set of blades such as 28 which project from the edge of the plate just inside the rim 24 toward the upper plate 21. Likewise, and in the same fashion, the upper plate 21 carries a set of blades such as 29 which are located at the edge of the plate just inside the rim 23 and extend toward the lower plate 22. The lower and upper sets of blades such as 28 and 29 are disposed so that blades in the lower set are alternately positioned relative to the upper set permitting the upper and lower sets of blades to intermesh as the plates 21 and 22 are moved together.

The lower plate 22 also carries a set of openings such as 31 alternately disposed between the blades 28 to accommodate passages of the upper set of blades 29 through the plate 22. The sectional view in FIGURE 3 reveals the lower plate 22, and slots 31 and blades 28 carried by the lower plate. In this view, the upper plate 21 and blades 29 have been removed. Likewise, the uper plate 21 carries a set of openings such as 32 in registry with the lower set of blades 28 to accommodate passage of these blades through plate 21. Thus, as the plates are moved together the lower set of blades 28 project a varying distance through the upper plate 21 and the upper set of blades 29 project a varying distance through the lower plate 22 depending upon the translational position of the control rod 26 along the axis 25 as shown in FIGURE 2.

In operation the agitator 6 is immersed in the fluid 12 and driven in rotation about the axis 25. The control rod 26 is positioned along the axis 25 by operation of the control 5. This control includes a lever 35 pivoted at a fulcrum 36 attached to the platform 1. One end of the lever connects to the end of the control rod 26 via a bearing 37 which rotatably engages the end of the control rod. The bearing 37 engages the end of the control rod 26 in such a fashion that the position of the bearing fixes the translational position of the control rod 26 along the axis 25, and yet permits the control rod to rotate freely within the bearing. At the same time, the bearing is pivotably connected to the end of the lever 35 so that as the lever is actuated about the fulcrum 36 the bearing 37 pivots slightly at the engagement point with the lever. The other end of the lever 35 engages a lever control rod 38 which is moveable along its axis by, for example, manual manipulation of lever control 39. The lever control 39 includes, for example, a manually controlled wheel 41 which turns a worm gear engaging a similar gear at the end of the lever control rod 38 and, thereby, positions rod 38 along its axis as desired to operate the lever 35 which, in turn, positions the control rod 26 to vary the area of the agitator blades 28 and 29 which extend into the fluid 12.

As already mentioned, blade angle is a parameter which effects mixing. Accordingly, the blades are preferably disposed at an angle $\alpha$ with respect to the tangent at the edge of the plate to which the blades are attached and so the projecting parts of these blades 28 and 29, illustrated in FIGURE 2, are disposed at an angle $\alpha$ to their direction of motion against the fluid and force the fluid 12 to circulate radially as represented by the flow paths 42 and 43 and so the fluid is mixed. The direction of motion is indicated by arrow 44.

A convenient technique for preventing the fluid from flowing up the hollow shaft 14 which would create many problems in cleaning and maintaining the equipment, is to provide a sealing bellows 45 which attaches and seals to the insides of the upper and lower plates 21 and 22 as shown in FIGURE 2. Thus, the bellows seals the inside of drive shaft 14 against the flow of the fluid 12 and yet permits movement of the plates in response to control movement of the rod 26.

In another embodiment of the invention illustrated in FIGURE 5 employing, for example, the same type agitator 6, the agitator is driven in rotation by application of rotational power from, for example, a motor to a drive shaft 51 which replaces the control rod 26 shown in FIGURES 1 to 4. The drive shaft 51 is attached to the agitator 6 in the same manner as the control rod 26 and accordingly, applies drive power to the agitator via the bottom plate 22 rather than the top plate 21 as in the embodiment illustrated in FIGURES 1 to 4. As illustrated in FIGURE 5, the area of the blades 28 and 29 which extends into the liquid medium 12 is not variable during operation of the mixer, but must be set before operation by manipulation of a sleeve 52 which attaches to the top plate 21, in much the same fashion as the hollow shaft 14 attaches to the top plate 21 in the embodiments of FIGURES 1 to 4. However, in FIGURE 5, the sleeve 52 does not transmit any drive power to the agitator, but merely serves to position the upper plate 21 relative to the lower plate 22, thereby to establish the area of the blades which project or protrude into the liquid medium 12. For this purpose, set screws or thumb screws 53 are provided for fixing the position of the sleeve 52 relative to the drive shaft 51. Obviously, in the embodiment in FIGURE 5, no external control mechanisms such as 5 and 39 are required for positioning the blades in the medium. It should be apparent, however, to those familiar with the art that means could be substituted for the thumb screws for varying the position of the sleeve 52 during operation of the mixer, thereby to vary the area of the blades 28 and 29 which project into the medium 12. For example, control structure not unlike the mechanisms 5 and 39 shown in FIGURE 1 could be employed for this purpose.

Two other types of agitators which could be substituted for the agitator 6 are illustrated in FIGURES 6 and 7 and FIGURES 8 and 9. The agitator illustrated by side and plane sectional views in FIGURES 6 and 7 carries blades or impellors which project radially from the agitator body rather than longitudinally as they do in agitator 6 and the radial projection of these blades is controlled by translational motion of the control rod 26 within the hollow drive shaft 14. This agitator includes a pillbox shaped housing 61 with a plurality of slots facing outward such as slot 62 arranged along the cylindrical portion of the housing to accommodate passage of the radially directed blades, such as 63, so that the blades may be projected more or less into the surrounding liquid medium. The blades such as 63 are each supported within the housing 61 by a bracket such as 64 attached to the housing and which includes a slot 65 in registry with a corresponding one of the slots 62. Thus, each blade is supported and slides radially through a pair of spaced slots such as 62 and 65.

Figure 7:
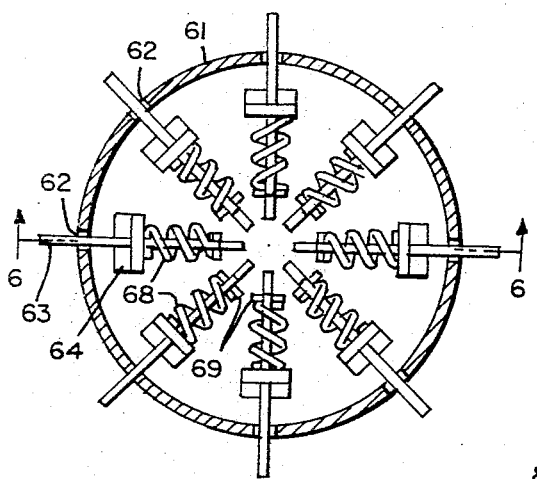

The blades are positioned by a cam mechanism attached to the end of the control rod 26. This includes, for example, a conical shaped cam 67 attached to the end of the control rod 26 and engaging the sloped ends of the blades 63 in such a manner that translational motion of the rod along the axis 25 causes the blades ot move radially and, thereby, project more or less into the surrounding medium. Each of the blades 63 are held firmly against the cam 67 by a spring such as spring 68 which encircles a portion of blade 63 and operates against the bracket 64 that supports blade 63 and against a boss 69 which is fixed to the blade. Thus, the spring urges the sloped end of the blade against the cam 67, maintaining positive contact therebetween at all times. A bellows 70 sealed to the cam 67 and the inside of the housing 61 prevents fluid from flowing up the inside of drive shaft 14. The view in FIGURE 7 is taken as shown but with the cam 67, bellows 70 and control rod 26 removed to reveal the blades.

Figure 8:
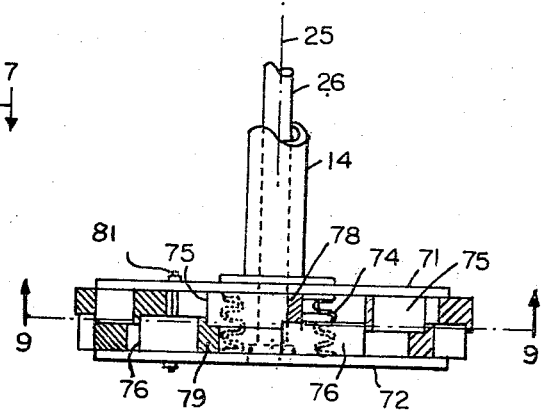
FIGURES 8 and 9 are side and plane sectional views of an agitator in which the impacting parts of impellors are covered or uncovered to thereby vary the area of each impellor or blade which is effective in the mixing process.
Figure 9:
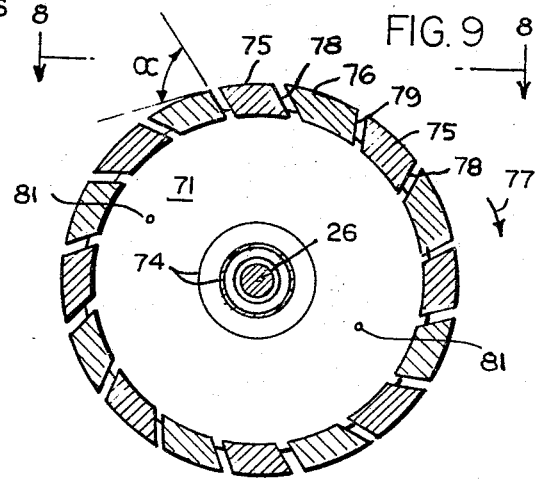

Another type of agitator suitable for use in the device illustrated in FIGURE 1 and having an action similar to agitator 6 is illustrated in FIGURES 8 and 9. In this embodiment, the hollow drive shaft 14 and the control rod 26 attach to upper and lower plates 71 and 72 which correspond substantially to the upper and lower plates 21 and 22 of agitator 6, the control rod projecting through an opening 73 in the upper plate 71. Also, similar to agitator 6, a bellows 74 is provided connecting the upper and lower plates to seal the hollow drive shaft 14 against entry of the fluid surrounding the agitator. Thus, the two plates 71 and 72 which form the body of the agitator are driven in rotation and positioned relative to each other to vary the mixing effects in much the same manner that agitator 6 is driven and controlled.

Each of the plates 71 and 72 carry a set of impellors disposed toward the edge of the plate and projecting radially therefrom and toward the opposing plate. The upper set of the impellors, such as impellor 75 carried by plate 71, at all times overlap at their ends the set of impellors, such as 76, carried by the lower plate 72. These impellors are shaped to impart radial motion to fluid when the agitator is rotated in the direction of the arrow 77. For this purpose each of the impellors includes at least one beveled surface such as surface 78 on impellor 75 and surface 79 on impellor 76 which define an angle to the periphery of the plate to which the impellor is attached. Thus, these beveled surfaces of the impellors which extend beyond the edge of the plate operate on the fluid in much the same fashion as the blades 28 and 29 of agitator 6 which are disposed at a similar angle $\alpha$ to the periphery of their associated support plates.

In order to prevent the plates 71 and 72 from sliding rotatably with respect to each other and, thus, imposing intolerable rotational forces on the bellows 74 and control rod 26, the impellors 75 and 79 are preferably designed to slideably overlap at all times during operation. For this purpose, each of the impellors includes a surface which mates continguously with the impelling surface of the overlapping impellor. In order to insure that such overlap occurs at all times and, thereby, prevent the upper and lower sets of blades from moving out of registry, a stop rod such as rod 81 extending through each of the plates and having flanges on it sends may be provided for limiting the separation of the plates in response to control action of the control rod 26.

This completes descriptions of the number of embodiments of the present invention of a mixing device including an agitator driven in rotation by a drive mechanism and carrying at least one set of impeller blades which project into the fluid medium which is mixed and with means for varying the area of said blades which impact against said fluid and accomplish the mixing, thereby providing a measure of control of said mixing. A number of embodiments are described herein including various drive mechanisms for positioning and powering the agitator and various types of agitators incorporating features of the invention. These embodiments, however, are described by way of example and do not limit the spirit and scope of the invention as set forth in the accompanying claims.

What is claimed is:

1. A device for mixing a fluid comprising a drive shaft, means for driving said shaft in rotation, means carried by said shaft including two sets each of a multitude of mixing blades each having a surface designed for imparting turbulence to said fluid in contact therewith, thereby causing said mixing, some of said sets of blades being arranged in a circular pattern concentric with said drive shaft and said blade surfaces subtending substantial areas transverse to their direction of motion when driven, so that each blade surface imparts substantial turbulence to said fluid when driven, and means for moving said blades relative to said shaft thereby varying the area of said surface thereof which impart turbulence to said fluid, to vary said mixing.

2. A device for mixing a fluid in a container comprising a drive shaft extending into said container, means supported at one end of said shaft for immersion in said fluid including at least some parts of which are moveable substantially axially relative to said shaft, means for driving said shaft in rotation, said moveable parts having surfaces for imparting turbulence to said fluid in contact therewith when said shaft is rotated, said other parts at the end of said shaft being equipped to cover a variable portion of said surfaces, subtending substantial areas transverse to their direction of motion and means concentric with said shaft for moving said parts relative to said shaft, thereby varying the area of said surface which imparts turbulence to said fluid and vary said mixing.

3. A device for mixing a fluid in a container comprising a drive shaft extending into said container, agitator means supported at one end of said shaft for immersion in said fluid, means for driving said shaft in rotation, said agitator means including a first member fixedly attached to said shaft and a second member moveable relative to said first member, each of said members carrying a plurality of impeller blades parts of which project into said fluid, said parts having surfaces subtending substantial areas transverse to their direction of motion for imparting turbulence to said fluid in contact therewith when said shaft is rotated, each of said members being equipped to cover a variable portion of said surfaces of said blades carried by the other member and means connected to said second member for moving said second member relative to said first member thereby varying the area of said surfaces which project into said fluid.

4. A device for mixing a fluid in a container comprising a drive shaft extending into said container, agitator means supported at one end of said shaft for immersion in said fluid, means for driving said shaft in rotation, said agitator means including a first member fixedly attached to said shaft and a second member disposed opposite said first member and moveable relative to said first member in a direction substantially parallel to the axis of said shaft, each of said members carrying a plurality of impellor blades parts of which project through suitable openings in the opposing member into said fluid, said parts being designed for imparting momentum to said fluid in contact therewith when said shaft is rotated and means connected to said second member for moving said second member relative to said first member, thereby to vary the area of said impellor parts which project into said fluid.

5. A device for mixing a fluid in a container comprising a drive shaft extending into said container, agitator means supported at one end of said shaft for immersion in said fluid, means for driving said shaft in rotation, said agitator means including a first member fixedly attached to said shaft and a second member disposed opposite said first member and moveable relative to said first member in a direction substantially parallel to the axis of said shaft, each of said members carrying a plurality of mixing bodies each having at least one surface subtending a substantial area transverse to the direction of motion of the blade when driven for imparting turbulence to said fluid when in motion, said surface being overlapped by the mixing blades carried by the opposing member, and means connected to said second member for moving said second member relative to said first member thereby varying the area of said mixing surfaces which impart turbulence to said fluid.

References Cited

UNITED STATES PATENTS

| | | | |
|---|---|---|---|
| 1,072,219 | 9/1913 | Fay | 259—96 |
| 1,489,787 | 4/1924 | Povey | 259—96 |
| 2,358,744 | 9/1944 | Stepanoff | 103—97 |
| 2,619,330 | 11/1952 | Williams | 259—96 |
| 3,222,038 | 12/1965 | Ashcraft | 259—105 |

WALTER A. SCHEEL, *Primary Examiner.*

ROBERT W. JENKINS, *Assistant Examiner.*